Feb. 9, 1932. F. HOTCHNER 1,843,980
CHANGEABLE LUMINOUS DISPLAY SIGN
Filed Oct. 1, 1931
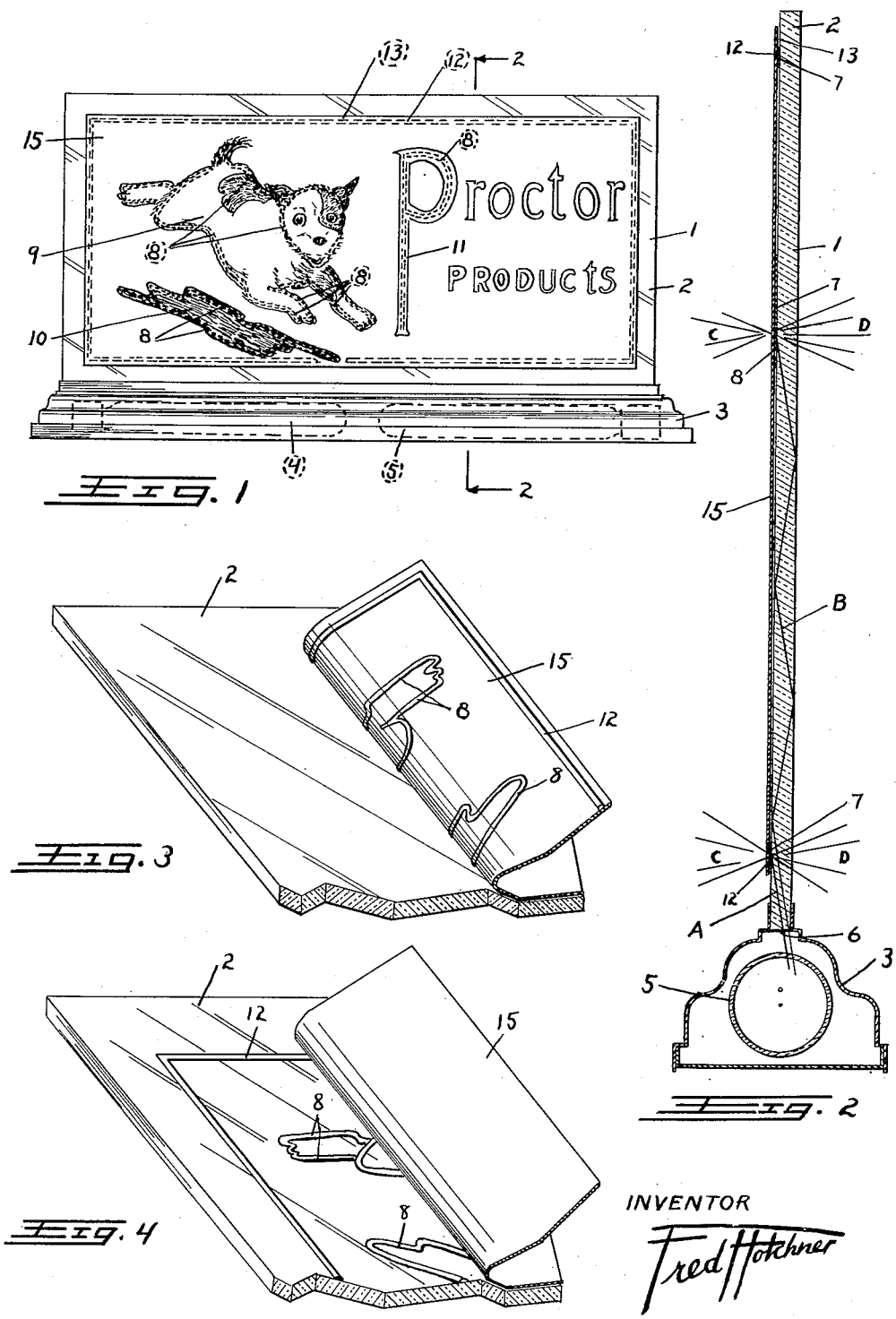
INVENTOR
Fred Hotchner Patented Feb. 9, 1932

1,843,980

UNITED STATES PATENT OFFICE

FRED HOTCHNER, OF CHICAGO, ILLINOIS

CHANGEABLE LUMINOUS DISPLAY SIGN

Application filed October 1, 1931. Serial No. 566,286.

This invention relates to a changeable luminous display sign, and the object is to provide means of producing luminous copy on a surface of a glass plate, which copy may be previously prepared on a sheet of flexible material, and which copy may be impressed on the glass or removed without the requirement of special skill or of any writing materials.

In my Patent No. 1,816,220 I have disclosed a method of producing apparently luminous copy on a glass plate having light projected therethrough without the use of writing materials by impressing portions of the surface of a flexible sheet suitably prepared onto the glass. The instant invention provides that the sheet is so prepared that the copy is not written by hand, but is automatically produced on the glass when the sheet is secured to it and disappears when the sheet is removed. In this manner, artistically and expertly prepared advertising copy may be produced, which inexpert persons may display and change at will.

It is a further object of the invention to provide a changeable copy-bearing sheet which upon being attached to the glass will provide proper distribution and utilization of the light available. It is to be understood that the amount of light traversing the glass plate is limited by practical considerations, and if broad copy surfaces were used they would cast a shadow on those surfaces most distant from the source of light because of the great amount of light that escapes from the portions of surface nearest the light. Thus if a sheet bearing printed copy were to be secured to the surface with light dispersing adhesive over its entire extent the illumination would be confined to those portions closest to the light, and the remainder of the sheet would be in comparative darkness. However, the invention provides that although the illuminated portions are limited in extent, additional unilluminated copy may be provided on the flexible sheet which is illuminated indirectly by the light escaping from the illuminated portions or by incident light from sources other than that included in the device itself.

The invention is illustrated in the accompanying drawings, which show a device made according to this invention in which both illuminated and non-illuminated copy is presented to view with the flexible sheet directly in the line of view between the glass and the observer, the illumination reaching the observer through the sheet. It is to be understood that this arrangement may be reversed and the sheet placed on the opposite side of the glass with the copy intended to be luminous printed on the side of the sheet towards the observer, so that the light does not pass through the flexible sheet, but through the glass to the observer.

The use of printed copy in addition to the luminous copy is optional.

In other modifications of the invention, the flexible sheet may be cut to various forms in simulation of the outline of represented objects.

Figure 1 is a front elevation of a sign made according to this invention.

Figure 2 is a section through the same taken on the line 2—2.

Figure 3 is a fragmentary view of a corner of the glass plate in perspective, showing the sheet partially peeled back to illustrate the disposition of the light dispersing adhesive material on the sheet which cooperates with the glass plate to provide areas through which light rays escape from the plate.

Figure 4 is a fragmentary perspective view of a corner of the device in a modified form of the invention in which the light dispersing material remains on the glass while the sheet is peeled away.

Numeral 1 indicates the device, which is composed of the glass plate 2, the base 3, in which are located suitable lights 4 and 5 and the replaceable flexible sheet 15.

Light rays projected into the edge 6 of the glass plate are totally reflected between opposing surfaces except at those places indicated by 7, 7, etc., in Figure 2, where the optical condition of the surface is altered by the material on the areas 8, 8, etc., of the sheets 15, which allows light rays to escape from the glass by dispersion. This material may be glue, rubber, or any one of numerous materials which form with the glass plate a continuous medium through which the rays pass instead of being reflected at the surface of the glass. Dispersion takes place in the material or on a surface of the material or the flexible sheet, which being of light dispersive character scatters the rays and thus renders those areas apparently luminous.

The picture of the dog 9 shown in Figure 1, if it were treated to be entirely light dispersive over the whole area would be poorly illuminated. So also if the shadow 10 were to have too great a light dispersive area it would rob the dog of illumination. These elements, therefore, are outlined by relatively narrow lines of dispersive material, indicated by 8, 8, etc., which are also adhesive and hold the sheet to the glass, the areas being selected according to the conditions of the particular case to best utilize the light available. Now, if we inspect the letter P in the printed copy, we will see that the long stroke 11 would be poorly lighted at the top if light were freely dissipated at the lower points. In fact, even though we make the stroke narrow, there is still a tendency for a shadow to be cast towards the top. But a narrow stroke derives a greater proportion of illumination from lateral rays, and this shadow is less apparent to the extent that the illumination will be fairly uniform as compared with the other elements in the design assuming that the dispersive areas of the rest of the design have been selected to allow sufficient lateral illumination to reach this stroke. Thus we see that, by restricting the area of adhesive, we can distribute in an effective manner the light to where it is desired.

The strips of adhesive are indicated in Figure 1 by dotted lines except in the case of all of the letters in the printed matter besides the large P.

As much additional printed copy or pictures may be used as are desired without altering the illuminated copy, which is confined to relatively simple lines capable of effective illumination.

The adhesive serves to hold the sheet tight to the plate at those places where light is escaping. Other portions of the sheet need not, so far as this function of the device is concerned, be tight to the plate. When the sheet is of very flexible material a border strip around the edge, indicated by 12, improves the appearance of the job and prevents the edges of the sheet from bending away from the glass. The adhesive strip in the border may be advantageously placed a short distance back from the edge, leaving an edge which may be grasped to peel the sheet away from the plate, as is indicated by 13.

In Figure 2 I have shown the manner in which light rays are transmitted through the glass sheet and dispersed at the adhesive strips. A indicates a ray which traverses the strip directly to the lower border strip indicated by 12. Here it is dispersed by the adhesive and renders the same apparently luminous. A percentage of the rays traverse the sheet directly to the remote dispersive areas, but the proportion falls off rapidly, and at a point such as that indicated by 8 the majority of the illumination is provided by rays which have been totally reflected between opposite surfaces such as that indicated by B.

The flexible sheet may be positioned either in front or in back of the glass plate as may be desired, it being previously prepared for positioning in either manner. Thus, if the device as shown in Figure 2 is to be viewed from the left, then the printed copy will be on the outside of the flexible sheet and the adhesive material on the opposite side. The rays of light indicated by C, C reaching the eye will pass through the sheet. If the device is to be viewed from the right, then the printing and the adhesive material will be on the side of the sheet in contact with the glass and the rays of light indicated by D, D will pass through the glass to the eye without traversing the sheet.

In Figure 3 I have shown the sheet partially peeled back to better illustrate the disposition of the adhesive strips.

In Figure 4 I have shown a modification of the invention in which the sheet is removed and the adhesive material remains on the surface of the glass. Numerous well known processes are available for preparing the adhesive material on the flexible sheet and causing the same to adhere to the glass in preference to the sheet. Thus the sheet may be of paper, and by moistening the same the adhesive material is loosened from the paper and remains on the glass.

In a generic sense the term "display pattern" as used herein includes any pattern of inscription, characters, figures, numerals, symbols, ornaments, designs, borders or signs, whether including but one or a number of such devices, or any combination of such devices, when used as the intended visible portion of the display according to the invention.

The term "copy" as used herein is to be understood as referring to any message or design.

The term "translucent" is used herein in its broadest sense as describing any body through which radiation may pass in such quantities as to render the same luminous to the eye from any normal angle of view.

Having thus described my invention, what I claim is:

1. In a changeable display sign, a body of light transmitting material, means to pass radiation through said body in such manner that some of the rays are reflected back into said body from a surface thereof, and a changeable copy member secured to said surface by adhesive material in the form of a display pattern partially covering the contacting surface of said member.

2. In a changeable display sign, a body of light transmitting material, means to pass radiation through said body in such manner that some of the rays are reflected back into said body from a surface thereof, and a changeable sheet copy member secured to said surface by adhesive material in the form of a display pattern partially covering the contacting surface of said sheet, said adhesive material providing an exit for a portion of the radiation incident thereupon whereby the escaping rays render the display pattern luminous to the eye.

3. In a changeable display sign, a body of light transmitting material, means to pass radiation through said body in such manner that some of the rays are reflected back into said body from a surface thereof, and a changeable translucent sheet copy member secured to said surface by adhesive material in the form of a display pattern partially covering the contacting surface of said sheet, said adhesive material providing a pathway for the exit of radiation from said body through said copy member thereby rendering said display pattern luminous to the eye from a point of view beyond said copy member.

4. In a changeable display sign, a body of light transmitting material, means to pass radiation through said body in such manner that some of the rays are reflected back into said body from a surface thereof, and a changeable translucent sheet copy member secured to said surface by adhesive material in the form of a display pattern partially covering the contacting surface of said sheet, said adhesive material providing a pathway for the exit of radiation from said body through said copy member thereby rendering the said display pattern luminous to the eye from a point of view beyond said copy member, and an additional non-luminous display pattern printed on said copy member and also visible to the eye.

5. In a changeable display sign, a body of light transmitting material, means to pass radiation through said body in such manner that some of the rays are reflected back into said body from a surface thereof, and a changeable sheet of flexible material secured to said surface by adhesive material in the form of a display pattern partially covering the contacting surface of said sheet.

6. In a changeable display sign, a body of light transmitting material, means to pass radiation through said body in such manner that some of the rays are reflected back into said body from a surface thereof, and a changeable sheet of flexible material secured to said surface by adhesive material in the form of a display pattern partially covering the contacting surface of said sheet and including a border strip positioned a short distance from an edge of said member.

7. In a changeable display sign, a body of light transmitting material, means to pass radiation through said body in such manner that some of the rays are reflected back into said body from a surface thereof, and a changeable sheet of flexible material secured to said surface by adhesive in the form of a display pattern partially covering the contacting surface of said sheet and including areas positioned around the edges of said sheet to prevent the edges of said sheet from curling away from said body.

8. In a changeable display sign, a body of light transmitting material, means to pass radiation through said body in such manner that some of the rays are reflected back into said body from a surface thereof, and a changeable sheet of flexible material secured to said body by adhesive material in the form of a display pattern partially covering the contacting surface of said sheet, said adhesive material serving to reflect some of said light rays through said body thus rendering the said display pattern luminous to the eye.

9. In a changeable display sign, a body of light transmitting material, means to pass radiation through said body in such manner that some of the rays are reflected back into said body from a surface thereof, and a changeable sheet of flexible material secured to said body by adhesive in the form of a display pattern partially covering the contacting surface of said sheet, said adhesive material serving to reflect light rays through said body thus rendering said display pattern luminous to the eye, and an additional display pattern printed on said sheet and also visible through said body by incident light.

10. The method of producing a luminous display pattern on a surface of a body of light transmitting material provided with means to pass radiation therethrough in such a manner that some of the rays are reflected back into said body from said surface which consists in applying to said surface a sheet of material carrying a display pattern of adhesive material partially covering the contacting surface of said sheet and capable of releasing light rays from said body by preventing the reflection of said rays back into said body.

11. The method of producing a luminous display pattern on a surface of a body of light transmitting material provided with means to pass radiation through said body in such manner that some of the rays are reflected back into said body from said surface which consists in applying to said surface a sheet of flexible material carrying adhesive material in the form of a display pattern and removing said sheet while leaving said adhesive material on said surface.

12. In a changeable display sign, a body of light transmitting material, means to pass radiation through said body in such manner that some of the rays are reflected back into said body from a surface thereof, and a changeable copy member secured to said surface by adhesive material in the form of a display pattern partially covering the contacting surface of said member, said adhesive material having the property of changing the angle of reflection of said rays so that they are dispersed and pass through the opposite surface of said body thus rendering said display pattern luminous to the eye.

Signed at Chicago, Illinois, this 30th day of September, 1931.

FRED HOTCHNER.